US005589267A

United States Patent [19]

Delwel et al.

[11] Patent Number: 5,589,267

[45] **Date of Patent: *Dec. 31, 1996**

[54] POLYVINYL ETHER ENCAPSULATED PARTICLES

[75] Inventors: Francois Delwel, Dordrecht, Netherlands; David J. Lang, Ossining, N.Y.

[73] Assignee: Lever Brothers Company, Division of Conopco, Inc., New York, N.Y.

[ * ] Notice: The term of this patent shall not extend beyond the expiration date of Pat. No. 5,480,577.

[21] Appl. No.: 459,915

[22] Filed: Jul. 17, 1995

Related U.S. Application Data

[63] Continuation-in-part of Ser. No. 239,663, May 9, 1994, Pat. No. 5,460,743.

[51] Int. Cl.[6] ................................ B32B 5/16; C11D 7/54; A62D 3/00

[52] U.S. Cl. ............... 428/407; 252/186.25; 252/186.26; 252/186.28; 427/213; 427/422; 427/425; 427/426; 428/484; 510/370; 510/372; 510/393

[58] Field of Search .................................... 428/403, 407, 428/484; 252/174.13, 174.23, 95, 186.25, 186.26, 186.27, 186.28; 427/213, 447, 421, 422, 425, 426

[56] References Cited

U.S. PATENT DOCUMENTS

| | | | |
|---|---|---|---|
| 4,919,841 | 4/1990 | Kamel et al. | 252/186.16 |
| 5,055,217 | 10/1991 | Garcia et al. | 252/94 |
| 5,200,236 | 4/1993 | Lang et al. | 427/213 |
| 5,230,822 | 7/1993 | Kamel et al. | 252/174.13 |
| 5,258,132 | 11/1993 | Kamel et al. | 252/94 |
| 5,281,355 | 1/1994 | Tsaur et al. | 252/174.13 |
| 5,441,660 | 8/1995 | Tsaur et al. | 252/95 |
| 5,460,743 | 10/1995 | Delwel et al. | 252/174.23 |
| 5,480,577 | 1/1996 | Nicholson et al. | 252/174.13 |

*Primary Examiner*—Hoa T. Le
*Attorney, Agent, or Firm*—A. Kate Huffman

[57] ABSTRACT

A polyvinyl ether and paraffin wax blend is described which is useful as a coating for encapsulates which are stable in an alkaline environment and which exhibit a volume % compressibility of 20° or less at 30° C. The polyvinyl ether material has a formula $[C_xH_{2x}O]_y$.

15 Claims, 3 Drawing Sheets

POLYVINYL ETHER ENCAPSULATED PARTICLES

This application is a Continuation-in-Part of U.S. Ser. No. 08/239,663, filed on May 9, 1994 now U.S. Pat. No. 5,460,743.

FIELD OF THE INVENTION

This invention concerns polyvinyl ether encapsulated particles having a solid core material which remain stable in liquid cleaning products. A method for encapsulating the core materials is also disclosed.

BACKGROUND OF THE INVENTION

Paraffin wax encapsulated particles are known in the art for protecting solid core materials which are unstable in a humid or liquid environment. The paraffin wax used for coating has a melting point range of from about 40° C. to about 50° C. and a required solids content to provide a coherent coating which will not leave a waxy residue upon cleaned dishware. See Lang et al. U.S. Pat. No. 5,200,236 and Kamel et al. U.S. Pat. No. 5,258,132.

Although these prior art encapsulates provide highly stable particles, the specific melting point range and solids content of the paraffin waxes useful for the encapsulates is quite narrow and commercially limiting. Moreover, wax encapsulated particles which are transported separately from the cleaning formulations into which they will ultimately be incorporated are highly compressible at elevated temperatures and fail to flow easily.

Attempts have been made to decrease the compressibility and increase the flowability of the wax encapsulated particles by including a wax additive into the coating or an outer coating around the wax with inconsistent results.

SUMMARY OF THE INVENTION

It is thus an object of the invention is to provide encapsulated particles exhibiting low compressibility and good flowability for improved transport and storage.

Another object of the invention to provide a polyvinyl ether blend encapsulated particle which has improved stability to degradation when exposed to ambient humidity or when incorporated into an aqueous liquid composition.

Another object of the invention is to provide a coating which melts sufficiently to release the active core during the washing cycle of an automatic dishwashing machine without leaving a coating residue on washed surfaces.

In the first aspect, the invention provides a polyvinyl ether blend coating around a solid core. The coating is made up of about 70 wt. %–1.0 wt. % polyvinyl ether and 99–30% by weight of one or more paraffin waxes having a melting point range of from about 30° C. to about 60° C. The polyvinyl ether has a formula $$[C_xH_{2x}O]_y \qquad (I)$$

wherein x is an integer from 18–22 and y is an integer from 150–300. Its exhibited viscosity is greater than 700 cps. The melting point range of the blend is about 40° C. to about 50° C., a solids content of 100% to about 35% at 40° C. and 0 to 15% at 50° C., with a viscosity of less than about 200 cps. The coating comprises 20–90% by weight, preferably 35–55% by weight, and more preferably 40–50% by weight of the particle. The coating preferably has a thickness of 100–1,500 microns, more preferably 200–750 microns, and most preferably from 200–600 microns.

The solid core of these particles can constitute from 10–80% by weight, preferably from 45–65% by weight, and more preferably 50–60% by weight of the final particles (i.e., core plus coating). Core materials include a bleaching agent, an enzyme, a peracid precursor, a bleach catalyst, a surfactant, etc. All of the core materials are unstable in a liquid environment or in the presence of bleach.

The second aspect of the invention includes a process of making the polyvinyl ether blend encapsulated particles. The particles are prepared by selecting a core material to be encapsulated, optionally agglomerating the selected core material, mobilizing the particles and coating the mobilized particles with the polyvinyl ether blend. The particles are coated by heating the polyvinyl ether and paraffin wax to a temperature above their melting point temperatures and then spraying the melted material onto the particles at an atomization temperature, which is preferably at least 5° C. above the melting temperatures for a time sufficient to form a continuous, coherent coating having a thickness of from 100–1,500 microns. Preferred processing methods include the use of a fluidized bed operation or a high shear rotating pan coating.

A third aspect of the invention comprises liquid cleaning compositions which include 0.1–20% by weight of the composition of the polyvinyl ether blend particles, including a core selected from a bleaching agent, an enzyme, a peracid precursor, a bleach catalyst or a surfactant. The liquid compositions further comprise 0.1–70% by weight builder, 0.1–30% by weight of an alkalinity agent and other cleaning components.

DETAILED DESCRIPTION OF PREFERRED EMBODIMENTS

Polyvinyl ether encapsulates

Polyvinyl ether material useful as a coating for the encapsulates of the invention has a formula $$[C_xH_{2x}O]_y \qquad (I)$$

wherein x is 18–22 and y is 150–300, preferably x is 18–22 and y is 150–280, most preferably x is 20 and y is 150–250.

The melting point range of the material of formula I is from about 40° C. to about 52° C., most preferably from about 45° to 52° C. as determined by a differential scanning calorimeter (DSC) described generally in Miller, W. J. et al., *Journal of American Oil Chemists' Society,* July 1969, vol. 46, no. 7, pp. 341–343, herein incorporated by reference.

Additionally, the viscosity of the polyvinyl ether material is above about 750 centipoises (cps) at 85° C. as measured with a cone and plate rheometer as known in the art. A preferred apparatus is a Carri-Med CSL-100 rheometer supplied by Carri-Med.

Figure 1:
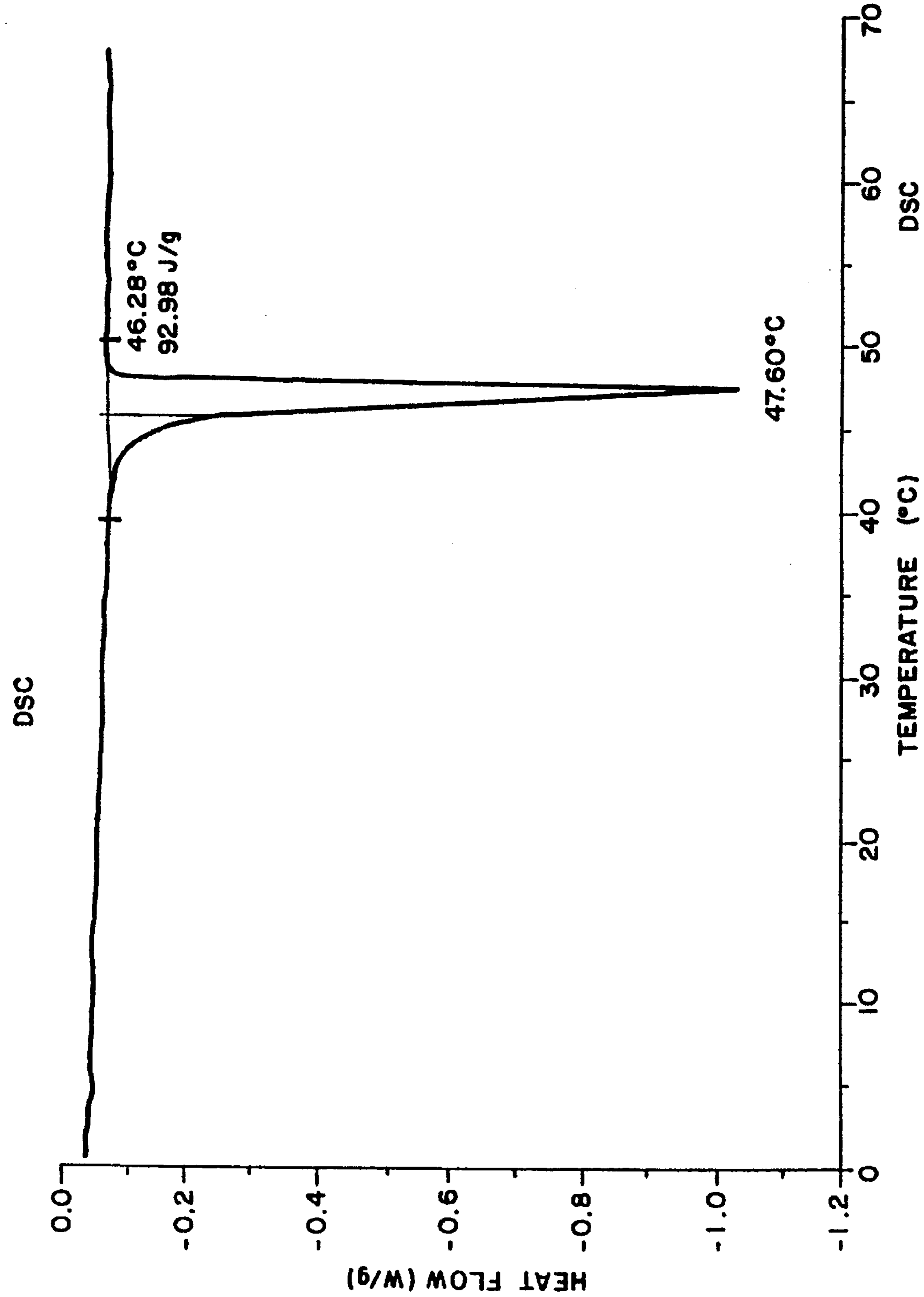
FIG. 1 is a graph of the melting point range of a polyvinyl ether material according to the invention.

The melting point range of polyvinyl ether is quite narrow and produces a sharp peak as illustrated by its DSC graph in FIG. 1. Additionally, unlike paraffin wax, there is not a distribution of other components such as branched alkanes, alkenes, and low molecular weight alkanes which may adversely affect the integrity of the resulting particles.

A preferred polyvinyl ether material is supplied by BASF under the Luwax V® series.

Because of the relatively high viscosity of pure polyvinyl ether, the material should be blended with one or more paraffin waxes to decrease the viscosity of the blend to below 200 cps, preferably 1–200 cps, most preferably 1–100 cps, while achieving the desirable melting point and solids content range.

Such a paraffin wax/polyvinyl ether coating blend must have a melting point range of between about 40° C. to about 50° C., a solids content of 100 to about 35% at 40° C. and a solids content of 0 to about 15% at 50° C. and a viscosity of less than 200 centipoises.

The coating blend should comprise 20–90% of the encapsulate. The amount of polyvinyl ether in the blend should be about 70% to about 1% by weight, preferably about 70% to about 3%, most preferably about 50% to about 5%.

99–30% by weight, preferably 99–30%, most preferably 95–50%, of one or more paraffin waxes having a melting point range of from about 30° C. to about 60° C. may be combined with the polyvinyl ether material to form the coating blend which will be useful within the scope of the invention. Highly refined paraffin waxes are preferred over slack waxes.

The polyvinyl ether material alters paraffin wax properties. Thus, paraffin waxes having a melting point range or solids content outside a useful range for achieving melting of the coating in an automatic dishwashing machine without spotting can be blended with polyvinyl ether to form a blend with desirable properties.

The polyvinyl ether/paraffin wax blend also reduces the compressibility of the encapsulates and thus improves their flowability. This improvement permits transport and storage of the encapsulates without special temperature controls. This allows transport of the encapsulates outside of the formula into which they will ultimately be combined, without compromising their stability. Compressibility should be measured by means of the test described in Example 9 for reproducible results. The compressibility of the encapsulates should be less than 25, preferably 20 or less and most preferably 15 or less at 30° C.

Figure 2:
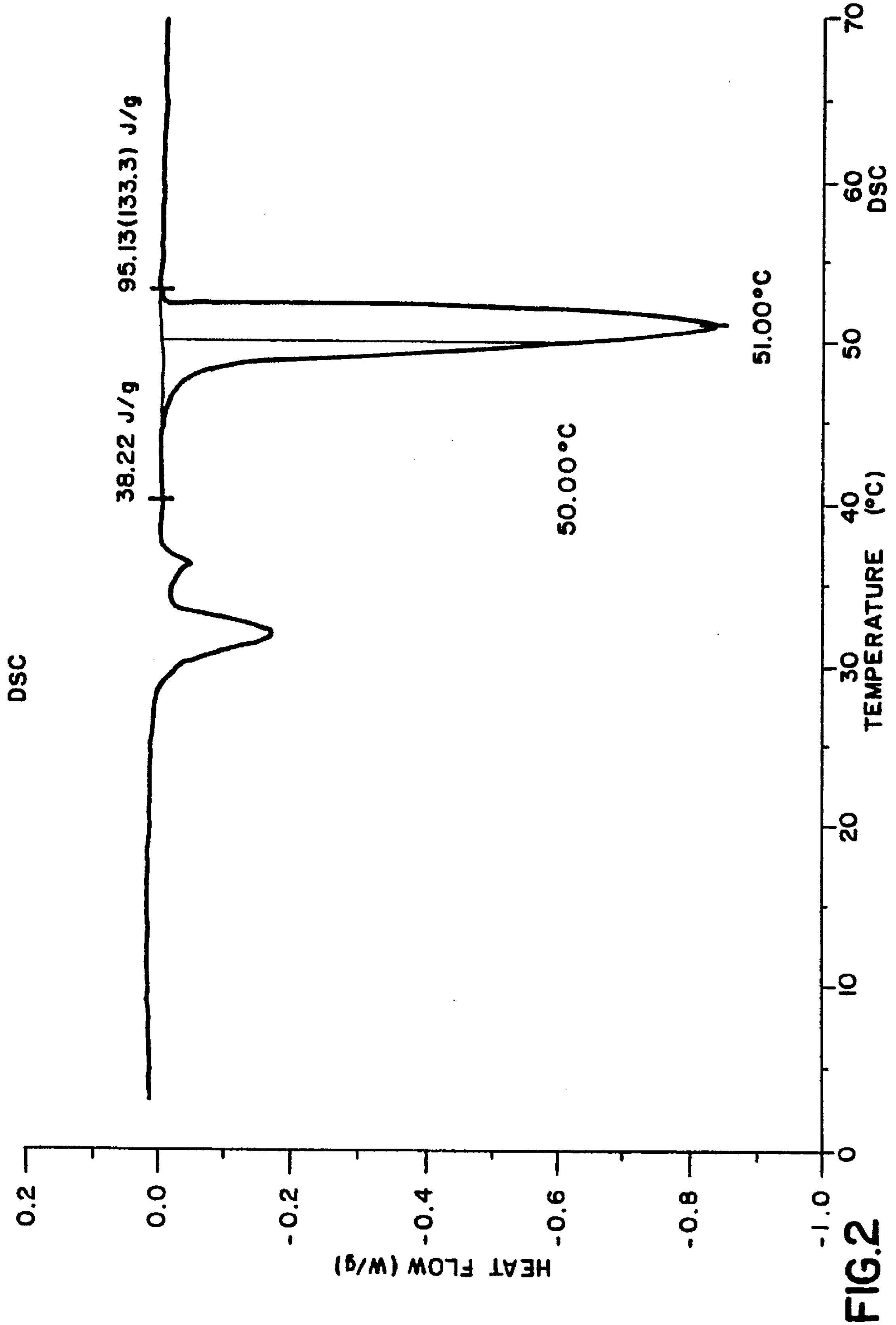
FIG. 2 is a DSC graph of a paraffin wax which alone does not provide a useful particle coating.

An example of the effectiveness of such a blend to produce coatings with desirable properties for a liquid composition is the combination of a 40% by weight paraffin wax with a 60% by weight polyvinyl ether material. A paraffin wax, (Boler 1072®) was used having a desirable melting point but undesirable solids content for an automatic dishwashing application. Specifically Boler 1072® has a solids content of 100% at 40° C. and 71% at 50° C., values outside the desired product range, although its melting point is 51° C. Boler 1072® also contains several solid components which are undesirable for a coating material. A DSC graph of Boler 1072® is shown in FIG. 2.

Figure 3:
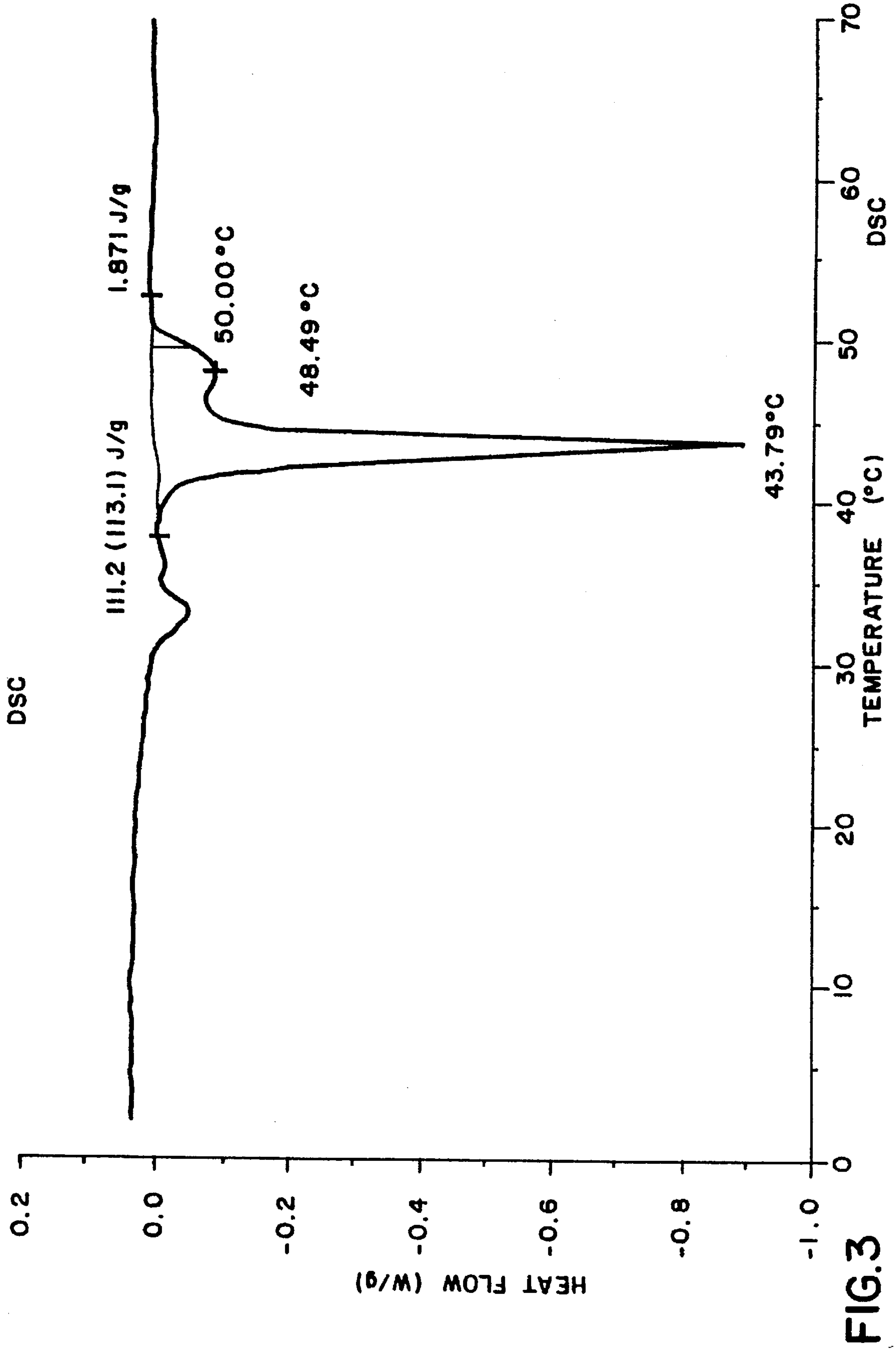
FIG. 3 is a DSC graph of a blend of the polyvinyl ether of FIG. 1 and the paraffin wax of FIG. 2 according to the invention.

The paraffin wax was blended with 60% polyvinyl ether (supplied as Luwax V®) and a DSC graph was obtained for the blend as shown in FIG. 3. As illustrated the blend has a solids content of 100% at 40° C., 1.6% at 50° C. and a melting point of 43.8° C.

Thus, the blend shifts the solids content of the paraffin wax about 70% (at 50° C.) to provide a desirable coating material. Additionally, the melting point of the mixture is lower than either of its components.

Even a relatively large amount of paraffin wax having undesirable properties in the blend does not impede the alteration of the wax characteristics by the polyvinyl ether to produce a blend which provides a useful coating. Moreover, the polyvinyl ether/paraffin wax blend provides particles which exhibit a greater resistance to compression while at the same time exhibiting increased flowability. Thus, particles with a paraffin wax coating which are stable in an alkaline environment exhibit decreased compressibility and increased flowability when the coating is a polyvinyl ether/paraffin wax blend.

Commercially available paraffin waxes which are suitable for combining with the polyvinyl ether material include Merck 7150® (54% solids content at 40° C. and 0% solids content at 50° C.) and Merck 7151® (71% solids content at 40° C. and 2% solids content at 50° C.) ex E. Merck of Darmstadt, Germany; Boler 1397® (74% solids content at 40° C. and 0% solids content at 50° C.), Boler 1538® (79% solids content at 40° C. and 0.1% solids content at 50° C.) Boler 1072®(100% solids content at 40° C. and 71.4% solids content at 50° C.) ex Boler of Wayne, Pa.; Ross fully refined paraffin wax 115/120 (36% solids content at 40° C. and 0% solids content at 50° C.) ex Frank D. Ross Co., Inc. of Jersey City, N.J.; Paramelt 4608® (80.3% at 40° C. and 0% at 50° C. solids content with a melting point of 44° C.) ex Terhell Paraffin of Hamburg, Germany and Paraffin R7214® ex Moore & Munger of Shelton, Conn.

Core Materials

The term "solid core" materials used in cleaning products which may be encapsulated in the invention means those components which are unstable in the presence of a bleaching agent in liquid or humid environments or a bleaching agent which is unstable in an aqueous environment, in particular in an alkaline aqueous environment. All of these materials will lose activity without a polyvinyl ether material coating according to the invention. Core materials within the scope of the invention include substantially non-friable solid materials which are water soluble or water dispersible or which dissolves, disperses or melts in the temperature range of about 40° C. to about 50° C. Such core materials include bleach, enzymes, peracid precursors, bleach catalysts, surfactants and perfumes.

The encapsulated core particle of the invention normally comprises 20–90% by weight of a single coat of polyvinyl ether blend and 10–80% by weight of a solid core material suitable for use in household and industrial strength cleaning compositions. Preferably the polyvinyl ether blend coating comprises 40–60% by weight of the particle and the core 40–60% by weight of the particle. Most preferably the coating comprises 40–50% by weight of the particle and the core 50–60% by weight of the particle.

In the preferred embodiment, the shape of the core is spherical or as close to this geometry as possible. It is further preferred to have a core particle size of 100–2,500 microns and more preferably from 500–1,500 microns in diameter.

Some of the core materials may be obtained commercially in a form which meets the preferred physical characteristics, such as, for example, solid bleach agents such as ACL® compounds from the Monsanto Company of North Carolina, and CDB from Olin Company of New Haven, Conn., and various enzyme marumes, obtained from Novo Industri NS of Copenhagen, Denmark.

Many of the other active core materials specified above are not commercially available with these preferred characteristics. It is then beneficial to produce composite core particles consisting of the active core ingredient and an agglomerating agent. The agglomerating agent must be stable and inert with respect to the active material. It also should not melt below about 40° C. to ensure stability during storage and encapsulation. The agent must also either be soluble or dispersible in alkaline solution or be completely molten at about 50° C. so that optimum performance is realized during consumer use. Optionally, an inert material meeting the same specifications as the agglomerating agent may be added to the agglomerated core particles.

Bleach

When the core material is a bleaching agent to be encapsulated in the polyvinyl ether blend coating, the bleach may be a chlorine or bromine releasing agent or a peroxygen compound. Among suitable reactive chlorine or bromine oxidizing materials are heterocyclic N-bromo and N-chloro imides such as trichloroisocyanuric, tribromoisocyanuric, dibromoisocyanuric and dichloroisocyanuric acids, and salts thereof with water-solubilizing cations such as potassium and sodium. Hydantoin compounds such as 1,3-dichloro-5, 5-dimethylhydantoin are also quite suitable.

Dry, particulate, water-soluble anhydrous inorganic salts are likewise suitable for use herein such as lithium, sodium or calcium hypochlorite and hypobromite. Chlorinated trisodium phosphate is another core material. Chloroisocyanurates are, however, the preferred bleaching agents. Potassium dichloroisocyanurate is sold by Monsanto Company as ACL-59® Sodium dichloroisocyanurates are also available from Monsanto as ACL-60®, and in the dihydrate form, from the Olin Corporation as Clearon CDB-56®, available in powder form (particle diameter of less than 150 microns); medium particle size (about 50 to 400 microns); and coarse particle size (150–850 microns). Very large particles (850–1700 microns) are also found to be suitable for encapsulation.

Organic peroxy acids and diacyl peroxides may be utilized as the bleach core. The peroxy acids usable in the present invention are solid compounds and substantially stable in the temperature range of about 40° to about 50°.

Typical monoperoxy acids useful herein include alkyl peroxy acids and aryl peroxy acids such as:

(i) peroxybenzoic acid and ring-substituted peroxybenzoic acids, e.g., peroxy-alpha-naphthoic acid, and magnesium monoperphthalate (ii) aliphatic and substituted aliphatic monoperoxy acids, e.g., peroxylauric acid, peroxystearic acid, 6-(N-phthalimido) peroxyhexanoic acid, and o-carboxybenzamido peroxyhexanoic acid.

Typical diperoxy acids useful herein include alkyl diperoxy acids and aryldiperoxy acids, such as:

(iii) 1,12-diperoxydodecanedioic acid (iv) 1,9-diperoxyazelaic acid (v) diperoxybrassylic acid; diperoxysebacic acid and diperoxyisophthalic acid (vi) 2-decyldiperoxybutane-1,4-dioic acid.

(vii) N-nonenylamidoperadipic acid and N-nonenylamidopersuccinic acid

A typical diacylperoxide useful herein includes dibenzoylperoxide.

Inorganic peroxygen compounds may also be suitable as cores for the particles of the present invention. Examples of these materials are salts of monopersulfate, perborate monohydrate, perborate tetrahydrate, and percarbonate.

Enzymes

Enzymes which are capable of facilitating removal of soils from a substrate are also suitable cores for the particle of the present invention. Such enzymes include proteases (e.g., Alcalase®, Savinase® and Esperase® from Novo Industries A/S), amylases (e.g. Termamyl® from Novo Industries A/S), lipases (e.g., Lipolase® from Novo Industries A/S) oxidases and celluloses. Enzymes may be present in an amount up to about 10 wt. %, preferably 0.5 to about 5 wt. %.

Bleach Catalysts

Bleach catalysts are also suitable as the core material of the present invention. Such suitable catalysts include a manganese (II) salt compound as described in U.S. Pat. No. 4,711,748. Other suitable catalysts are described in U.S. Pat. No. 5,041,232 issued to Batal et al., e.g., sulfonimine compounds, herein incorporated by reference. The catalysts may be admixed with, or adsorbed upon other compatible ingredients. Product formulations containing encapsulated bleach catalysts of the present invention may also contain a bleaching agent whose action is to be catalyzed. The bleaching agent may also be optionally encapsulated according to the present invention.

Peroxygen Bleach Precursors

Peracid precursors, preferably in granular form of size from 100 to 2,500 microns, preferably 500 to 1,500 microns are also suitable as cores for the particles of the present invention. Peracid precursors are compounds which react in the bleaching solution with hydrogen peroxide from an inorganic peroxygen source to generate an organic peroxy acid. They are also susceptible to hydrolysis, and cannot normally be formulated directly into aqueous cleaning compositions. Peracid precursors, encapsulated according to the present invention, would be incorporated into products along with a source of hydrogen peroxide, which also could optionally be encapsulated according to the present invention.

Peracid precursors for peroxy bleach compounds have been amply described in the literature, including in British Nos. 836,988; 855,735; 907,356; 907,358; 907,950; 1,003, 310 and 1,246,339; U.S. Pat. Nos. 3,332,882 and 4,128,494; Canadian No. 844,481 and South African No. 68/6,344.

Typical examples of precursors are polyacylated alkylene diamines, such as N, N, N', N'-tetraacetylethylene diamine (TAED) and N, N, N', N'-tetraacetylmethylene diamine (TAMD); acylated glycolurils, such as tetraacetylglycoluril (TAGU); triacetylcyanurate, sodium sulphophenyl ethyl carbonic acid ester, sodium acetyloxybenzene sulfonate (SABS), sodium nonanoyloxybenzene sulfonate (SNOBS) and choline sulfophenyl carbonate.

Peroxybenzoic acid precursors are known in the art, e.g., from GB-A-836988. Examples thereof are phenylbenzoate; phenyl p-nitrobenzoate; o-nitrophenyl benzoate; o-carboxyphenyl benzoate; p-bromophenyl benzoate; sodium or potassium benzoyloxybenzenesulfonate; and benzoic anhydride.

Preferred peroxygen bleach precursors are sodium p-benzoyloxybenzene sulfonate, N, N, N', N'-tetracecetylethylene diamine, sodium nonanoyloxybenzene sulfonate and choline sulfophenyl carbonate.

In another embodiment, this invention provides a means of protecting bleach sensitive surfactants from an aqueous solution of bleach by encapsulating the surfactant with a paraffin wax coating. This embodiment is particularly useful in an automatic dishwashing liquid formulation in which the aqueous phase contains sodium hypochlorite, and the surfactant is a nonionic surfactant, for example, an alkoxylated alcohol. In such an application, it may be necessary to first absorb the surfactant onto a solid carrier, particularly if the surfactant is a liquid or a low melting solid. Suitable carriers for surfactants are disclosed in Dittmer et al., GB 1,595,769 and Czempik et al. in U.S. Pat. No. 4,639,326, herein incorporated by reference.

Wax Additives

To increase the stability of the encapsulates when subject to low temperatures of around −18° C., wax additives may be added to the polyvinyl ether material in amounts of from about 0.1 wt. % to about 10 wt. %, preferably 0.5 wt. % to about 3 wt. %, most preferably from about 0.5 wt. % to about 1 wt. %, as described in Lang et al, U.S. Pat. No. 5,200,236, herein incorporated by reference. A preferred additive is hydrogenated methyl ester of rosin supplied as Hercolyn D® series from Hercules, Inc. of Wilmington, Del.

Outer Coatings

A second coating of a proper material over the polyvinyl ether material may also be used to further enhance the compressibility of the particles as described in Kamel et al., U.S. Pat. No. 5,258,132.

The Process of Encapsulating Solid Core Particles

The process steps of encapsulating the solid core particles comprise:

(a) selecting a core material to be encapsulated, (b) optionally agglomerating the selected core material to form a particle having a diameter of 100 to 2,500 microns, (c) mobilizing the particles, (d) selecting 70 to about 1% by weight of a polyvinyl ether material having a melting point range of about 40° C. to about 52° C. to coat the particles, (e) heating the polyvinyl ether material to a temperature sufficiently above its melting temperature to melt the polyvinyl ether, (f) selecting 99%–30% of a paraffin wax having a melting point range of about 30° C. to about 60° C.

(g) heating the paraffin wax to a temperature sufficiently above its melting temperature to melt the paraffin wax, (h) blending the melted polyvinyl ether with a sufficient amount of the melted paraffin wax to obtain a final viscosity of the blend of less than about 200 cps, and (i) spraying the melted blend onto the particles at an atomization temperature which is preferably at least 5° C. above the melting temperature of the blend for a time sufficient to form a continuous, coherent coating of a thickness of from 100 to 1,500 microns on the particles, preferably from 200 to 750 microns.

The amount of coating applied to the core particles is typically from about 20 to 90%, preferably about 40 to 60% and most preferably 40–50% by weight of the total particle (i.e., core plus coating).

Coating Process

There are several methods of processing the encapsulates of the invention. In a fluidized bed operation utilizing a top spray, air is introduced into the bed from below while the coating material is sprayed onto the fluidized material from above. The particles move randomly in the bed in this top spray operation.

An alternative method is the Wurster mode. In this method, the material is sprayed from the bottom of the bed concurrently with the air flow. The particles move in a well-defined flow pattern as is known in the art.

Unless precautions are taken in applying molten coating materials in fluidized beds, the resulting material can be poorly coated or, alternatively, agglomerated together. These equally undesirable results follow from the temperature settings in operating the fluidized bed. For example, when the temperature of the bed is too far below the melting point of the polyvinyl ether and paraffin wax blend material, the blend will quickly begin to solidify as soon as it enters the cool bed region. Thus, the coating blend loses some of its ability to adhere to the surface of the particles, and the material itself quickly solidifies. When this occurs, the fluidized bed is operating to produce fine coating particles with little coating on the core particles. The poorly coated core particles consequently have little stability from ambient humidity or an aqueous liquid environment. Alternatively, when the bed temperature is too high, the blend which does contact the particles fails to cool sufficiently and so remains soft and sticky. Consequently, particles clump and agglomerate. It becomes difficult to control the size of the resulting clumps. This can result in unacceptable properties for use in consumer products, such as dispensing problems. Additionally, agglomerates may easily break apart during handling to expose the core material to the environment. Thus, improper control of the fluidized bed temperatures can produce encapsulated bleach which fails to meet one of the objects of the invention.

Applicants have discovered that, even with the coatings of up to 1,500 micron thickness, proper control of the bed temperature and the atomization temperature in a fluidized bed avoids agglomeration. Thus, when the bed temperature is from 20° C. to no higher than the melting point of the material, "spray cooling" of the material and agglomeration of coated particles is reduced. Preferably, the bed temperature is 20° to 35° C. and most preferably 25° to 32° C.

Applicants have further discovered that atomization temperature, or the temperature at which the material is sprayed from a nozzle onto the fluidized bed, is advantageously held at least about 5° to 10° C. above the melting temperature of the blend. When the top spray mode is used, the maximum atomization temperature is about 35° C. greater than the wax melting point; above this temperature, too great a percentage of the particles agglomerate. When the Wurster mode is used to coat particles, the atomization temperature may be as high as 50° C. and more above the blend melting point temperature. This is found to be a practicable atomization temperature despite the expectation that partially coated particles with molten coats would stick to the spray nozzle. It is instead found that the air flow is strong enough to detach these partially coated particles. Alternatively, applicants have found that the temperature of the molten material may be maintained substantially above the material melting point, e.g., from 50° to 100° C. above the melting point. When this is the case, the atomization temperature is preferably near the melting temperature of the blend, in order to lower the temperature of the atomized blend sufficiently to solidify quickly on the particles in the fluidized bed.

When using the top spray mode for encapsulation, applicants have discovered that performing an additional annealing step after coating the particles in a top spray fluidized bed further improves the capsules. "Annealing" is the name given to a further heating of wax-encapsulated bleach particles at a temperature greater than room temperature but below the wax melting point. This heating step is performed with the bed being fluidized, i.e., with warm air flowing through it; however, no molten material is being sprayed on to the particles during annealing. The annealing step renders the material mobile enough that it fills in gaps and cracks in its surface, thus providing a better seal to the bleach within.

The temperature chosen for annealing is one which softens the material without rendering it sticky. Typically, this temperature is from 5° to 15° C. greater than the bed temperature during coating, and from 3° to 15° C. less than the melting point of the polyvinyl ether coating material. For example, when the material has a melting point of 46° C., the annealing temperature may be about 33°–34° C. The bed temperature during spraying is only about 31°–32° C., for above 32° C. there is a good chance the particles will agglomerate i.e., the high temperature of the molten material, combined with coating material at the bed temperature, would so soften the material that particles would agglomerate in the fluidized bed. However, when no hot molten material is being sprayed on the particles, an annealing temperature alone in the bed is not warm enough to cause agglomeration.

Most preferably, annealing should be performed for a period of between 10 minutes and 48 hours, optimally between about 1 and 24 hours. Mixing the capsules with an inert material, such as an amorphous silica, alumina or clay, prevents capsule sticking during the annealing process. Incorporation of the inorganic annealing adjunct allows use of higher temperatures during the annealing process, thus shortening the annealing period. Adjuncts may be used in an amount relative to the weight of the overall capsule in the ratio of 1:200 to 1:20, preferably 1:100 to 1:30.

A preferred alternative to the top spray of molten coating material is the Wurster spray mode. This method is described in detail in U.S. Pat. No. 3,253,944, which is hereby incorporated by reference. In general, fluidized beds are characterized by randomness of particle motion. Random motion is undesirable when coating particles because of the resultant slow coating rates. To overcome this problem, a cyclic flow pattern is established in the Wurster spray mode by controlled velocity differences.

The Wurster mode involves use of a vertically disposed coating tower wherein particles are suspended in an upwardly flowing air stream entering the bottom of the tower. This air stream imparts controlled cyclic movement to the particles with a portion of the suspended bed flowing upwardly inside the tower and the other portion downwardly outside the tower. All of the coating material is directed into the high velocity air stream to provide coating of the particles moving upwardly in the tower. The fluid coating solidifies on the surface of the particles as the air stream lifts them away from the nozzle. The particles are carried to the top of the tower from which point they fall to the base of the tower along a path outside the tower. At the base, the particles are drawn in through openings and redirected upwardly in the air stream inside the tower. This cycle is repeated until the desired amount of coating has been deposited on the particles.

Given the steps of Wurster, it was believed that the Wurster mode would be inappropriate for encapsulating particles in material. Additionally, conventional wisdom taught that the relatively slow movement of particles in the Wurster bed would result in agglomeration. Applicants surprisingly discovered that agglomeration in the Wurster mode is significantly lower then in the top spray mode. The spray nozzle for Wurster is located at the bottom of the fluidized bed and sprays coating materials upwards. It was believed this configuration of the spray nozzle would lead to clogging of the spray nozzle when coated and agglomerated particles fell from the upward air spray into the nozzle area. This risk seemed especially high because the nozzle temperature is generally above the melting point of the material coating. However, applicants have surprisingly discovered that use of the Wurster spray mode results in many benefits.

When operated under optimum conditions, upwards to 5–15% of the particles coated by top spray may agglomerate, and so be unusable, whereas the level of agglomerated particles from the Wurster application of a fluidized bed rarely exceeds 2% of the particles.

It is generally preferred to use a spray-on rate of from about 10 to about 40 g/min/kg. for economic processing and good product quality. However, it has been found advantageous to use lower rates of spraying from about 1 to 10 g/min/kg. at the commencement of each batch, when the uncoated particles are relatively fragile and small, before increasing the spray-on rate to a higher level, so as to shorten the processing time. However, the lower rates can be employed throughout the spray-on process if desired, or if only thin coatings are required for specific products.

Moreover, the coating time with the Wurster configuration can take half as long as top spray, or less, even with a substantially lower air flow rate, as demonstrated in Example I below. Although batch size is often smaller than in top spray, and the rate of spraying material onto the core from each nozzle is not substantially higher in the Wurster mode, still the production rate of the encapsulated particles may be as much as 2 to 3 times higher by the Wurster mode due to an increased number of nozzles possible in the unit. This higher production rate may be maintained even when the air flow rate through the fluidized bed is lower than for the top spray mode. Thus, higher production rates with lower air flow rates in the Wurster mode produce particles with less agglomeration than the top spray mode.

A further advantage discovered by applicants in using the Wurster spray mode is that no annealing step is needed. More accurately, self-annealing occurs automatically as part of the coating process when the Wurster mode is used. The hot molten material droplet contacting the partly coated bleach particle causes the solid wax already on the particle to melt and to fill any cracks in the coating surface. Unlike the spray-coated particles in top spray mode, which fall into a crowded mass of other particles in the fluidized bed, the particles in the Wurster mode move out of the spray tower and fall through the less crowded space outside the tower due to the well defined flow pattern of the particles in the Wurster mode. Thus, the particles have time to cool sufficiently before contacting other particles.

There are many commercially available fluid bed apparatuses which are suitable for use in the process of the invention; among these are the GPCG-5 and GPCG-60 models of Glatt Air Techniques of Ramsey, N.J.. These two models can coat 8 to 225 kg loads of the particles in from 0.5 to 3 hours, respectively. Table top encapsulation may be carried out in laboratory scale apparatuses as well, as for example in Granuglatt Model No. WSG-3, ex Glatt Air Techniques.

High Shear Rotating Pan Coating

An alternative process to the top spray and bottom spray process to produce encapsulated particles for liquids is the high shear rotating pan coating unit. This apparatus combines the high shear bed movement with superior coating and cooling properties of a bottom spray fluid bed. Generally it comprises an inner and an outer process zone. The inner zone creates particle movement comparable to the movement produced by a high shear vertical granulator. The outer zone is a low particle density fluid bed region where the particles flow in a well defined pattern. This outer zone is comparable to the venturi tube region of a bottom spray fluid bed. In a preferred embodiment the zones are defined by an inner and outer chamber.

The bottom part of the inner zone is a rotary disc with a cone in the middle. The surface of the disc can be either smooth or textured. Air is introduced into the plenum beneath the rotary disc to prevent product from depositing between the disc and the wall and from penetrating into the lower part of the unit. The lower, stationary part of the wall separating the two zones has openings for one or more spray nozzles. The upper, movable part of the wall can be lifted to create an adjustable ring gap. This opening allows the product to pass into the outer fluidized bed region of the unit where the coating is cooled and hardened in a low density fluidized region. This outer annular chamber has a stationary perforated bottom plate through which cool air flows upwards to fluidize and cool the particles.

With ideal operating parameters the particles move past the coating nozzle where molten polyvinyl ether material is sprayed onto the particles. They then flow through the gap into the outer fluidized bed region of the unit and are carried upward in a distinct flow pattern over the wall in a low particle density region of the bed. This allows only minimal collision of the coated particles before cooling and hardening of the coating material occurs. The particles then fall back into the bed of particles which is rotating at high speed on top of the rotating disc. The rotation creates a substantially helical movement of the individual particles and a velocity gradient through the bed. This high speed movement of the particles minimizes their agglomeration. This is especially beneficial when the particles have a tacky surface as is the case when a warm coating of coating material is present.

Critical parameters must be used for the operation of the high shear rotating pan coater for the proper formation of nonagglomerated, encapsulated particles having a continuous coating. The most important parameters which must be controlled to obtain well coated particles for liquid products are the disc rotation speed, bed temperature, and coating spray rate.

The plate speed must be well controlled in order to achieve a continuous coating which will protect the core material when submersed in aqueous liquids containing surfactants. This speed is related to the momentum of the particles as they move past the spray nozzles. Smaller coating units and light particles will therefore require higher plate rotational speeds to impart the same momentum to the particles. When the momentum of the particles is too low, unacceptably high levels of agglomeration will occur and problems will arise from material sticking to various parts of the unit such as the center of the spinning disc. If the momentum of the particles is too high, the polyvinyl ether blend will distribute quickly on the surface to form spherical beads. When the original core material is not spherical (which is the more general case) this will leave thin areas in the coating or even some of the core protruding through the coating. It is also possible that such high momentum will cause the coating to crack when the particles collide with each other or parts of the equipment. The result of these effects is to produce extremely poor encapsulates with low stability. Thus, the momentum of the particles on the plate surface at its periphery is preferably between 0.1 g.cm/sec and 15.0 g.cm/sec and most preferably between 0.5 g.cm/sec and 5.0 g.cm/sec.

The temperature of the bed must also be well controlled to minimize the level of agglomeration that occurs. A result of the particles being in closer contact with one another is that the bed temperature must be lower than the bottom spray fluid bed described in the foregoing method in order to achieve the same coating quality, even when working with the same materials. This lowers agglomeration by promoting more rapid hardening of the material coating. The bed temperature is preferably 15° to 30° C. below the melting point of the material, most preferably 20° to 25° C. below the material's melting point. Higher bed temperatures will result in heavy agglomeration and poor coating which results from it along with defects resulting from protruding areas of the core. Lower temperatures result in the material hardening too quickly and not forming a continuous coating on the particles. To achieve this bed temperature the fluidizing air temperature and volume must be well controlled. The volume of fluidizing (cooling) air is also constrained and set by the bed size and the need to produce good fluidization of the particles. Good fluidization is defined here as moving all the particles in a uniform pattern without allowing any of them to become stagnated or form a dead spot in the bed.

Operating under these conditions, it has been found that coating rates of up to 30 g/min per kg of core are possible. This rate is dependent on the cooling capacity of the bed (fluidizing air temperature), temperature of the coating liquid, and particle momentum. Since the particles are much smaller at the beginning of the batch, it has been found that agglomeration is minimized by starting with coating rates of 10 g/min per kg core or lower and then increasing the coating rate as the particles grow. The temperature of the liquid polyvinyl ether blend prior to spraying is preferably 25° to 60° C. higher than its melting point. Higher temperatures cause agglomeration by raising the bed temperature and cause the problems previously discussed. Lower temperatures result in spray cooling the material and incomplete coatings.

The atomization air pressure is preferably between 3.0 and 5.0 bar. This causes the formation of small droplets which are required to minimize agglomeration. The nozzles are spraying into the bed of particles and the use of large droplets of molten material would result in excessive redistribution of the material between colliding particles which would ruin the crystal structure of the hardening material and increase the permeability of the coating. The atomization air temperature is preferably 5° to 50° C. above the material's melting point to ensure that the material leaving the nozzle tip has not already started to crystallize and harden before reaching the core particles. The slit air pressure between the plate and wall was seen to have very little effect on the encapsulate quality.

A distinct advantage of the high shear rotating pan coater process over the fluid bed type equipment is that a flow aid may be directly added to the bed of particles within the unit at the conclusion of the coating process. Normally flow aid materials are very low density powders which would be entrained and carried into the filters of top and bottom spray fluid beds. Only a small fraction of the added flow aid would be found on the particle surface. The high shear rotating pan coater apparatus has the capability of stopping the fluidization at the conclusion of the coating process and then operating the unit as a vertical granulator (i.e., rotating the coated particles in the inner zone). The flow aid may then be added and distributed through the bed homogeneously and with nearly complete recovery of the flow aid on the particles.

High shear rotating pan coater units are commercially supplied as Rotoprocessor® units by Niro-Aeromatic of Columbia, Md.

Another processor which may be adapted for the high shear rotating pan coater process is the Rotocoat® unit supplied by Sandvik Process Systems, Inc. of Totowa, N.J.

The Cleaning Compositions Incorporating the Encapsulated Particles

The encapsulated particles of the invention may be incorporated into a variety of powder and liquid cleaning compositions, such as automatic machine dishwashing, hard surface cleaners and fabric washing cleaners for both household and industrial use. Most of these compositions will contain from about 1–75% of a builder component and will also contain from about 0 to about 40% of a surfactant, preferably about 0.5% to about 20% by weight of the composition.

The surfactant may be encapsulated according to the invention to prevent mutual degradation with a bleaching agent which is not coated in the formula. The encapsulated surfactant would be present in an amount of 0.1 to 5% by weight of the composition.

Encapsulated chlorine bleach is especially suitable for automatic dishwashing liquid or "gel" detergent products where the encapsulated particles will normally be present in an amount of 0.1 to 20% by weight of the composition.

Other ingredients which may be present in the cleaning composition include cleaning enzymes, peracid precursors or bleach catalysts. Any one or more of these ingredients may also be encapsulated before adding them to the composition. If such ingredients are encapsulated they would be present in the following percentages by weight of the composition:

| | |
|---|---|
| enzyme | 0.1 to 5% |
| peracid precursor | 0.1 to 10% |
| bleach catalyst | 0.001 to 5% |
| peracid | 0.1 to 10% |

Automatic dishwashing detergent powders and liquids will usually have the compositions listed in Table I.

TABLE I

Automatic Dishwashing Detergent Compositions

| COMPONENTS | PERCENT BY WEIGHT POWDER FORMULATION | LIQUID FORMULATION |
|---|---|---|
| Builder | 0–70 | 0–60 |
| Surfactant | 0–10 | 0–15 |
| Filler | 0–60 | — |
| Alkalinity Agent | 0.1–40 | 0.1–30 |
| Silicate | 0–40 | 0–30 |
| Bleaching Agent | 0–20 | 0–20 |
| Enzymes | 0–5 | 0–5 |
| Enzyme Stabilizing System | — | 0–15 |
| Antifoam | 0–2 | 0–2 |
| Bleaching Catalyst | 0–5 | 0–5 |
| Thickener | — | 0–5 |
| Bleach Scavenger | 0–5 | 0–5 |
| Perfume | 0–2 | 0–2 |
| Water | to 100 | to 100 |

Gels differ from liquids in that gels are primarily structured by polymeric materials and contain little or no clay.

Detergent Builder Materials

The cleaning compositions of this invention can contain all manner of detergent builders commonly taught for use in automatic dishwashing or other cleaning compositions. The builders can include any of the conventional inorganic and organic water-soluble builder salts, or mixtures thereof and may comprise 1 to 90%, and preferably, from about 5 to about 70% by weight of the cleaning composition.

Typical examples of phosphorus-containing inorganic builders, when present, include the water-soluble salts, especially alkali metal pyrophosphates, orthophosphates and polyphosphates. Specific examples of inorganic phosphate builders include sodium and potassium tripolyphosphates, phosphates, pyrophosphates and hexametaphosphates.

Suitable examples of non-phosphorus-containing inorganic builders, when present, include water-soluble alkali metal carbonates, bicarbonates, sesquicarbonates, borates, silicates, layered silicates, metasilicates, and crystalline and amorphous aluminosilicates. Specific examples include sodium carbonate (with or without calcite seeds), potassium carbonate, sodium and potassium bicarbonates, silicates and zeolites.

Particularly preferred inorganic builders can be selected from the group consisting of sodium tripolyphosphate, potassium pyrophosphate, sodium carbonate, potassium carbonate, sodium bicarbonate, sodium silicate and mixtures thereof. When present in these compositions, sodium tripolyphosphate concentrations will range from about 2% to about 40%; preferably from about 5% to about 30%. Sodium carbonate and bicarbonate when present can range from about 5% to about 50%; preferably from about 10% to about 30% by weight of the cleaning compositions. Sodium tripolyphosphate and potassium pyrophosphate are preferred builders in gel formulations, where they may be used at from about 3 to about 30%, preferably from about 10 to about 20%.

Organic detergent builders can also be used in the present invention. Examples of organic builders include alkali metal citrates, succinates, malonates, fatty acid sulfonates, fatty acid carboxylates, nitrilotriacetates, phytates, phosphonates, alkanehydroxyphosphonates, oxydisuccinates, alkyl and alkenyl disuccinates, oxydiacetates, carboxymethyloxy succinates, ethylenediamine tetracetates, tartrate monosuccinates, tartrate disuccinates, tartrate monoacetates, tartrate diacetates, oxidized starches, oxidized heteropolymeric polysaccharides, polyhydroxysulfonates, polycarboxylates such as polyacrylates, polymaleates, polyacetates, polyhydroxyacrylates, polyacrylate/polymaleate and polyacrylate/polymethacrylate copolymers, aminopolycarboxylates and polyacetal carboxylates such as those described in U.S. Pat. Nos. 4,144,226 and 4,146,495.

Alkali metal citrates, oxydisuccinates, polyphosphonates and acrylate/maleate copolymers are especially preferred organic builders. When present they are preferably available from about 1% to about 35% of the total weight of the detergent compositions.

The foregoing detergent builders are meant to illustrate but not limit the types of builder that can be employed in the present invention.

Surfactants

Surfactants may be preferably included in the household cleaning product incorporating the encapsulated particles. Such surfactants may be encapsulated or not for inclusion in the composition. Useful surfactants include anionic, nonionic, cationic, amphoteric, zwitterionic types and mixtures of these surface active agents. Such surfactants are well known in the detergent art and are described at length in "Surface Active Agents and Detergents", Vol. II, by Schwartz, Perry & Birch, Interscience Publishers, Inc. 1959, herein incorporated by reference.

After the capsule has melted, it remains molten or resolidifies depending on the temperature of the washing medium. Whether in molten or solid state, however, the polyvinyl ether, alone or in combination with a paraffin wax, may deposit on the surface of pieces being washed as a soil and impart a spotted, streaked or filmy appearance to those pieces. Such soil may also build up on the surfaces in which cleaning is being performed or in cleaning machines.

This soiling by the coating may be reduced by incorporating one or more surfactants in the cleaning composition.

Thus, a preferred embodiment of the cleaning composition comprises 0.1–15% by weight encapsulated bleach as described above; 1–75% builder; and 0.1–15% surfactant selected from the group consisting of nonionic surfactants, including those of formula $$R-(CH_2\underset{R^1}{\underset{|}{C}}HO)_x(CH_2CH_2O)_y(CH_2\underset{R^2}{\underset{|}{C}}HO)_zH \quad (II)$$

where R is a $C_6$–$C_{10}$ linear alkyl mixture, $R^1$ and $R^2$ are methyl, x averages 3, y averages 12 and z averages 16, polyoxyethylene or mixed polyoxyethylene/polyoxypropylene condensates of aliphatic alcohols containing 6–18 carbon atoms and 2–30 alkylene oxide.

Silicate

The compositions of this invention may contain sodium or potassium silicate at a level of from about 1 to about 40%, preferably 1–20% by weight of the cleaning composition. This material is employed as a cleaning ingredient, source of alkalinity, metal corrosion inhibitor and protector of glaze on china tableware. Especially effective is sodium silicate having a ratio of $SiO_2$:$Na_2O$ of from about 1.0 to about 3.3, preferably from about 2 to about 3.2. Some of the silicate may be in solid form.

Filler

An inert particulate filler material which is water-soluble may also be present in cleaning compositions in powder form as described in Lang, U.S. Pat. No. 5,200,236.

Thickeners and Stabilizers

Thickeners are often desirable for liquid cleaning compositions. Thixotropic thickeners such as smectite clays including montmorillonite (bentonite), hectorite, saponite, and the like may be used to impart viscosity to liquid cleaning compositions. Silica, silica gel, and aluminosilicate may also be used as thickeners. Salts of polyacrylic acid (of molecular weight of from about 300,000 up to 6 million and higher), including polymers which are cross-linked may also be used alone or in combination with other thickeners. Use of clay thickeners for automatic dishwashing compositions is disclosed for example in U.S. Pat. Nos. 4,431,559; 4,511,487; 4,740,327; 4,752,409. Commercially available bentonite clays include Korthix H and VWH ex Combustion Engineering, Inc.; Polargel T ex American Colloid Co.; and Gelwhite clays (particularly Gelwhite GP and H) ex English China Clay Co. Polargel T is preferred as imparting a more intense white appearance to the composition than other clays. The amount of clay thickener employed in the compositions is from 0.1 to about 10%, preferably 0.5 to 5%. Use of salts of polymeric carboxylic acids is disclosed for example in UK Patent Application GB 2,164,350A, U.S. Pat. Nos. 4,859,358 and 4,836,948.

For liquid formulations with a "gel" appearance and rheology, particularly if a clear gel is desired, a chlorine stable polymeric thickener is particularly useful. U.S. Pat. No. 4,260,528 discloses natural gums and resins for use in clear autodish detergents, which are not chlorine stable. Acrylic acid polymers that are cross-linked manufactured by, for example, B.F. Goodrich and sold under the trade name "Carbopol" have been found to be effective for production of clear gels, and Carbopol 940 and 617, having a molecular weight of about 4,000,000 is particularly preferred for maintaining high viscosity with excellent chlorine stability over extended periods. Further suitable chlorine-stable polymeric thickeners are described in U.S. Pat. No. 4,867,896 incorporated by reference herein.

The amount of thickener employed in the compositions is from 0 to 5%, preferably 0.5–3%.

Defoamer

Liquid and "gel" formulations of the cleaning composition comprising surfactant may further include a defoamer. Suitable defoamers include mono- and distearyl acid phosphate, silicone oil and mineral oil. Even if the cleaning composition has only defoaming surfactant, the defoamer assists to minimize foam which food soils can generate. The compositions may include 0.02 to 2% by weight of defoamer, or preferably 0.05–1.0%.

Minor amounts of various other components may be present in the cleaning composition. These include bleach scavengers including but not limited to sodium bisulfite, sodium perborate, reducing sugars, and short chain alcohols; solvents and hydrotropes such as ethanol, isopropanol and xylene sulfonates; flow control agents (in granular forms); enzyme stabilizing agents such as borate, glycol, propanedial, formate and calcium; soil suspending agents; antiredeposition agents; anti-tarnish agents; anti-corrosion agents; colorants other functional additives; and perfume. The pH of the cleaning composition may be adjusted by addition of strong acid or base. Such alkalinity or buffering agents include sodium carbonate.

EXAMPLES

The following examples will more fully illustrate the embodiments of the invention. All parts, percentages and proportions referred to herein and in the appended claims are by weight unless otherwise indicated.

Example 1

A batch of polyvinyl ether bleach particles are prepared by a top spray process. Clearon CDB-56 bleach particles are coated with 1:1 blend of Luwax V® polyvinyl ether and Paramelt 4608® paraffin (solids content of 80.3% at 40° C. and 0% at 50° C., melting point of 44° C.) under the following conditions:

TABLE 2

| (Batch A) | |
|---|---|
| Fluidized Bed Apparatus | Glatt WSG-5 |
| Spray Mode | Top spray |
| Nozzle | Middle port with 11" extension |
| Nozzle Tip Diameter | 1.2 mm. |
| Volume | 22 liter |
| Bed Weight | 11 lbs. |
| Air Flow Rate | 400–450 cfm |
| Inlet Air Temperature | 27–32° C. |
| Bed Temperature | 28–32° C. |
| Coating Rate | 52 g/min |
| Coating Temperature | 75–80° C. |
| Atomization Air Pressure | 2.5 Bar |
| Atomization Air Temperature | 80–90° C. |
| Batch Time | 148 minutes |

Example 2

Polyvinyl ether encapsulated bleach particles were prepared in a fluidized bed by coating a 1:19 blend of Luwax V® polyvinyl ether and Boler 1397® paraffin onto Clearon CDB-56® bleach particles under the following conditions:

TABLE 3

| | |
|---|---|
| Spray Mode | Wurster |
| Unit | Glatt GPCG-46 |
| Partition Height | 3 cm |
| Nozzle Tip Diameter | 1.5 mm |
| Nozzles | 6 |
| Volume | 900 liters |
| Bed Weight | 612 kg |
| Air Flow Rate | 4000–5500 liters/min. |
| Inlet Air Temperature | 10–15° C. |
| Bed Temperature | 26–28° C. |
| Coating Rate | 3350–5200 g/min. |
| Coating Temperature | 80–90° C. |
| Atomization Air Pressure | 1.5 Bar |

TABLE 3-continued

| | |
|---|---|
| Atomization Air Temperature | 80–90° C. |
| Batch Time | 89 minutes |

The resulting particles had a 50% coating and were stable in an alkaline environment.

Example 3

Polyvinyl ether encapsulated particles were prepared by a high shear rotating pan process by coating a 50% blend of 1:9 Luwax V® polyvinyl ether and Paramelt 4608® paraffin wax onto Clearon CDB-56® bleach particles in an Aeromatic MP-1 Rotoprocessor® apparatus supplied by Aeromatic of Bubendorf, Switzerland, under the following conditions:

TABLE 4

| | |
|---|---|
| Spray Mode | Rotoprocessor ® |
| Unit | Aeromatic MP-2 |
| Partition Height | 24 mm |
| Nozzle Tip Diameter | 1.2 mm |
| Core Particle Charge | 12.0 kg |
| Air Flow Rate | 1250–1400 $m^3$/hr |
| Inlet Air Temperature | 15–20° C. |
| Bed Temperature | 18–22° C. |
| Coating Rate | 250 g/min |
| Slit Pressure | 2.5 Bar |
| Atomization Air Temperature | 75° C. |
| Plate Rotation Speed | 200–300 rpm |
| Atomization Air Pressure | 3.5 Bar |
| Wax Temperature | 70–85° C. |
| Nozzles | 3 |
| Batch Time | 48 minutes |

The resulting capsules were observed to be stable in an alkaline environment.

Example 4

Batch A of encapsulated bleach particles coated with a 1:19 blend of Luwax V® polyvinyl ether and Boler 1397® paraffin wax were prepared by the parameters described in Example 2 above. Batch B encapsulated bleach particles coated with Boler 1397® paraffin wax were also prepared as described in Example 2. 1.8 grams of the particles of Batches A & B were each placed in 40 grams of an autodish liquid composition having the following formula:

TABLE 5

| Ingredients | % Weight (gms) |
|---|---|
| Nonionic surfactant[1] | 60 |
| Sokalan CP7 ®[2] | 150 |
| Carbopol 627 ®[3] | 42.0 |
| Citric acid | 587.7 |
| Sodium hydroxide | 720 |
| Borax | 90.0 |
| Glycerol | 180.0 |
| Sodium sulfite | 3.0 |
| Protease | 9.0 |
| Amylase | 9.0 |
| Encapsulates | 129.5 |
| Water | 959.8 |

[1]LF403 supplied by BASF
[2]Acrylate/maleate copolymer supplied by BASF
[3]Acrylic acid polymer, m.w. ~4,000,000 supplied by B.F. Goodrich The procedure for making this autodish gel formulation was as described in the examples of Lang et al. U.S. Pat. No. 5,200,236, herein incorporated by reference.

Autodish formulations containing either Batch A or Batch B encapsulates were used to wash dishware in a Bosch SMS 5432 dishwasher to determine if wax deposits were left on cleaned surfaces. 25 ml per wash of each sample were placed in each dishwasher run and washed at 55° C. for 200 washes. Each dishwasher contained 6 glasses, Tupperware lid, coffee cups, tea cups, saucers, tupperware tray, teflon pan, yellow soft melamine plates, stainless steel plates, stainless steel knifes and spoons. The dishware articles were visually inspected for wax deposits after 50, 100 and 200 washes.

It was observed that there were a few wax deposits on the tupperware tray and melamine plates washed with the formula containing the prior art wax capsules (Batch B). No deposits were observed, in contrast, on the cleaned surfaces of the dishware washed with the formula containing the inventive capsules (Batch A).

Example 5

Encapsulates of clearon CDB-56 particles were coated with 10% polyvinyl ether material (Luwax V®) and 90% paraffin wax (Paramelt 4608®) using an Aeromatic MP-2 Rotoprocessor® apparatus under the conditions described in Example 3 above.

The resulting encapsulates were added to a zero-phosphate built automatic dishwashing composition prepared as described in Lang et al. U.S. Pat. No. 5,200,236, herein incorporated by reference. The composition has the following formula:

| Ingredients | % Weight (grams) |
|---|---|
| Sokalan CP7 ®[1] | 150.0 |
| Carbopol 627 ®[2] | 42.0 |
| Citric acid | 587.7 |
| Sodium hydroxide | 720.0 |
| Borax | 90.0 |
| Glycerol | 180.0 |
| Sodium sulfite | 3.0 |
| Nonionic surfactant[3] | 60.0 |
| Enzymes | 18.0 |
| Encapsulates | 129.5 |
| Water | 959.8 |

[1]Acrylate/maleate copolymer supplied by BASF
[2]Acrylic acid polymer m.w. ~4,000,000 supplied by B.F. Goodrich
[3]LF 403 ® supplied by BASF The encapsulates would be tested to determine if any deposits would be observed on cleaned surfaces by the procedure described in Example 4.

Example 6

The stability of the inventive capsules versus the prior art capsules were compared by preparing two batches of encapsulates as follows.

Batch A encapsulates were prepared by coating Clearon CDB-56 bleach particles with 100% Boler 1397® paraffin wax. Batch B was prepared by encapsulating Clearon CDB-56 particles with a mixture of 5% Luwax V® polyvinyl ether and 95% Boler® 1397 paraffin wax. Both batches A & B were prepared using the processing conditions described in Example 2 above for the Wurster® process.

A 1.8 gram sample of each Batch A and B was evenly dispersed throughout the automatic dishwashing liquid formulation described in Example 4 above.

Samples were stored at both room temperature and at 37° C. for at least 6 weeks and remaining enzyme activity was determined. The following results were obtained.

| | % Enzyme Activity Remaining After 6 Weeks | | | |
|---|---|---|---|---|
| | Protease | | Amylase | |
| Batch | Room Temperature | 37° C. | Room Temperature | 37° C. |
| A Paraffin wax coating | 96 | 86 | 91 | 45 |
| B 5% polyvinyl ether/ 95% paraffin wax coating | 100 | 92 | 95 | 43 |

It was observed that the inventive capsules (Batch B) were as stable, if not more stable than the prior art capsules (Batch A)

A comparison of the flowability of encapsulates coated with paraffin wax alone versus a polyvinyl ether and a paraffin wax mixture was conducted with Batch A encapsulates (100% Boler 1397® paraffin wax coating) and Batch B (coating admixture of 5% polyvinyl ether and 95% Boler 1397® paraffin wax). (See Example 2 above.)

To compare the flowability of the two batches, 555 kg of encapsulates were loaded into each of two bags. The bags were unloaded to observe the flow patterns of the encapsulates.

Batch A, encapsulated with the paraffin wax coating alone, lumped together and did not flow out of the bag.

In contrast, Batch B encapsulates, coated with polyvinyl ether and paraffin wax, had a good flow rate with no lumping observed.

Example 7

Encapsulates coated with 10% polyvinyl ether/90% paraffin wax (Batch C) were compared to the prior art encapsulates of Batch A (see example 5) for stability.

A 1.8 gram sample of each of Batch A and C was evenly dispersed in the automatic dishwashing formula described in Example 5.

Five milliliter aliquots were removed from each of the autodish liquid samples and filtered through USA standard metal sieves, 18 mesh, to remove particles. The coatings were dissolved from each particle by gentle stirring in hexane for 20 minutes. The amount of active chlorine remaining was then measured by standard iodometric titration and the observed results are summarized in Table 6:

TABLE 6

| | Chlorine Stability | |
|---|---|---|
| Time | Percent Available Chlorine Remaining | |
| Days | Batch A | Batch C |
| 0 | 100 | 100 |
| 3 | 99.5 | 97.5 |
| 5 | 99.5 | 97.5 |
| 10 | 99.5 | 97.5 |
| 15 | 99.5 | 97.5 |
| 21 | 99.5 | 97.5 |

It was thus observed that the encapsulates according to the invention were as significantly stable as encapsulates of the prior art.

Example 8

Effective fluid bed coating of solid particles within the fluid bed by either the Wurster® or Rotoprocessor® techniques requires a relatively low viscosity fluid to easily atomize at the nozzle and then properly wet the surface of the encapsulates before solidification. The coating fluid should be less than about 200 cps and preferably less than about 100 cps.

Polyvinyl ether supplied as Luwax V® alone even at a temperature of 85° C. exhibits a viscosity of 750 cps. It is therefore necessary to combine the Luwax V® with a paraffin wax to produce a polyvinyl ether paraffin blend satisfactory for proper encapsulation.

Mixtures having various ratios of polyvinyl ether:paraffin wax:and a wax additive were prepared and viscosity data of the mixtures was obtained using a Carri-Med CSL-100 Rheometer operated in the cone and plate geometry with a 6 cm diameter and 2 degree cone. The measurements were all made at 80° C. The materials all exhibited Newtonian behavior. The observed viscosities are as tabulated in Tables 7 and 8 as follows:

TABLE 7

| Coating Composition - Weight Percent | | | |
|---|---|---|---|
| Paraffin Wax[1] | Wax Additive[2] | Polyvinyl Ether[3] | Viscosity (cps) at 80° C. |
| 100 | 0 | 0 | 3.0 |
| 99 | 1 | 0 | 3.4 |
| 94 | 1 | 5 | 5.4 |
| 74 | 1 | 25 | 18 |
| 49 | 1 | 50 | 62 |
| 0 | 0 | 100 | 860 |

[1]R7214 supplied by Moore & Munger
[2]Hercolyn D supplied by Hercules Inc.
[3]Luwax V ® supplied by BASF

TABLE 8

| Coating Composition - Weight Percent | | | |
|---|---|---|---|
| Paraffin Wax[1] | Wax Additive[2] | Polyvinyl Ether[3] | Viscosity (cps) |
| 100 | 0 | 0 | 3.0 |
| 99 | 1 | 0 | 3.2 |
| 94 | 1 | 5 | 5.3 |
| 74 | 1 | 25 | 18 |
| 49 | 1 | 50 | 74 |
| 0 | 0 | 100 | 860 |

[1]Boler 1397 ® supplied by Boler of Wayne, PA
[2]Hercolyn D supplied by Hercules Inc.
[3]Luwax V ® supplied by BASf It is noted that the paraffin wax (R7214) used to obtain the results reported in Table 7 has a solids content and melting point range outside the desirable range. The paraffin wax (Boler 1397®) used in the coating blend of Table 8 has a solids content and melting point within the desired range. Both waxes were observed to lower the viscosity of the polyvinyl ether. The pure ether had a viscosity of 860 while a blend of 50% polyvinyl ether and 50% paraffin wax lowered the viscosity value to about 70 cps.

It is further noted that the presence of the wax additive had no significant effect on the reported viscosities of the blend.

Example 9

Compressibility of the inventive capsules was determined by preparing the following four batches of encapsulates as described in Example 3:

| Batch | Coating Materials |
|---|---|
| 1 | Paraffin wax[1] |
| 2 | 90% Paraffin wax[1]<br>10% Polyvinyl ether[2] |
| 3 | Paraffin wax[3] |
| 4 | Paraffin wax[3] |

The following two batches were prepared by the Wurster method described in Example 2.

| Batch | Coating Materials |
|---|---|
| 5 | 95% Paraffin wax[3]<br>5% Polyvinyl ether[2] |
| 6 | 95% Paraffin wax[3]<br>5% Polyvinyl ether[2] |

[1]Paramelt 4608 ® supplied by Terhell of Germany
[2]Luwax V ® supplied by BASF
[3]Boler 1397 ® supplied by Boler of Wayne, PA A sample of each batch was compressed as follows: A plexiglass cylinder 54 mm in diameter and 170 mm high was fitted with a piston. The top of the piston has a platform head to maintain a weight which applies pressure to the piston and hence the encapsulates. The total weight applied was 25 kg. (1050 g/cm$^2$) including the piston weight.

The total 25 kg weight was allowed to rest freely on the encapsulate sample at 30° C. and left for 60 seconds. The final volume of the sample was then measured by means of a plunger calibration scale and the percentage reduction in volume was calculated as follows:

$$\%\text{ decrease in volume (as a \% of original volume)} = \frac{100 \times (\text{initial volume} - \text{final volume})}{\text{initial volume}}$$

The following results were obtained:

| Batch | Compressibility (Vol %) at 30° C. |
|---|---|
| 1 | 40–44 |
| 2 | 14 |
| 3 | 21–25 |
| 4 | 24 |
| 5 | 14 |
| 6 | 11 |

It was found that encapsulates having a compressibility of less than about 25 were acceptable to ship and handle encapsulates and maintain flowability.

Thus the combination of polyvinyl ether with paraffin wax (Batches 2, 5 and 6) decreased the compressibility of encapsulates coated with paraffin wax alone (Batches 1, 3 and 4).

Example 10

Sodium percarbonate particles are provided with a 50% coating of a blend of 5% Luwax V® and 95% Boler 1397 paraffin wax. The encapsulation is carried out in a Granuglatt® fluid bed using the Wurster mode described in Example 2 above.

Example 11

Savinase® 6.OT marumes (ex Novo Industries A/S) particle size 550–650 μm are coated with a 50 weight percent coating of a 1:1 blend of Luwax V® polyvinyl ether and Boler 1397 paraffin wax with the Wurster process as described in Example 2.

We claim:

1. A encapsulated particle for use in liquid cleaning compositions comprising:

a. 20–90% by weight of a continuous coating blend comprised of i. 70 wt. % to 1 wt. % of a polyvinyl ether material having a formula $$[C_xH_{2x}O]_y \tag{I}$$

wherein x is an integer from 18–22 and y is an integer from 150–300; and ii. 30% to 99% of a paraffin wax having a melting point range of from about 30° C. to about 60° C.

wherein the coating blend has a viscosity of less than about 200 centipoises as measured by a cone and plate rheometer at 80° C., a melting point range of about 40° C. to about 50° C. and a solids content of from about 35 to 100% at 40° C. and from about 0 to about 15% at 50° C.; and b. 10 to 80% by weight of a core particle or an aggregate of core particles which are water soluble or water dispersible, or which dissolve, disperse or melt in a temperature range of from about 40° C. to about 50° C.

wherein the particle is stable in an alkaline environment and exhibits a volume % compressibility of 20 or less at 30° C.

2. The encapsulated particle according to claim 1 wherein the polyvinyl ether material is present in the coating blend in an amount of 70% to about 3%.

3. The encapsulated particle according to claim 2 wherein the polyvinyl ether material is present in the coating blend in an amount of 50% to about 5%.

4. The encapsulated particle according to claim 1 wherein the paraffin wax has a melting point range of from about 40° C. to about 60° C.

5. The encapsulated particle according to claim 1 wherein the core material is selected from a group consisting of an oxidative bleach, a bleach catalyst, an enzyme, a percompound activator and a surfactant.

6. The encapsulated particle according to claim 5 wherein the core particle is an oxidative bleach.

7. The encapsulated particle according to claim 6 wherein the oxidative bleach is a hypochlorite-generating compound.

8. The encapsulated particle according to claim 6 wherein the oxidative bleach is a peroxygen compound.

9. The encapsulated particle according to claim 8 wherein the peroxygen compound is a hydrogen peroxide generating compound.

10. The encapsulated particle according to claim 1 wherein the core material is a cleaning enzyme selected from the group consisting of a protease, a lipase, an amylase, an oxidase, a cellulose and mixtures thereof.

11. The encapsulated particle according to claim 1 wherein the core material is a bleach catalyst.

12. The encapsulated particle according to claim 1 wherein the core material is a percompound activator.

13. An encapsulated particle for use in liquid cleaning compositions having 20–90% by weight of a continuous coating blend comprised of:

i. 70 wt. % to 1 wt. % of a polyvinyl ether material having a formula $$[C_xH_{2x}O]_y \quad (I)$$

wherein x is an integer from 18–22 and y is an integer from 150–300; and ii. 30% to 99% of a paraffin wax having a melting point range of from about 30° C. to about 60° C., wherein the coating blend has a viscosity of less than about 200 centipoises as measured by a cone and plate rheometer at 80° C., a melting point range of about 40° C. to about 50° C. and a solids content of from about 35 to 300% at 40° C. and from about 0 to about 15% at 50° C., and 10 to 80% by weight of a core particle or an aggregate of core particles which are water soluble or water dispersible, or which dissolve, disperse or melt in a temperature range of from about 40° C. to about 50° C., the continuous coating blend being coated around the core particle or aggregate of core particles by a process comprising the steps of:

(a) heating the coating blend to a temperature above a melting temperature of the coating blend to sufficiently melt the blend to form a molten mixture;

(b) rotating the core particle or aggregate of core particles in a substantially helical pattern in an inner zone of an encapsulation apparatus;

(c) spraying the molten coating mixture onto the core particle or aggregate of core particles rotated in step (b) at a rate and for a time sufficient to apply a continuous coherent coating of from about 100 to about 1500 microns thick around each of the particles; and (d) passing air upwardly through an outer zone of the encapsulation apparatus to maintain a temperature of a bed within the inner zone of from about 15° C. to about 30° C. below the melting point of the coating blend mixture to fluidize and cool the particles and form a batch of encapsulated particles having a continuous coating blend which is stable in a liquid alkaline environment and exhibits a volume % compressibility of 20 or less at 30° C.

14. The encapsulated particle according to claim 13 wherein the particles rotated in step (b) exhibit a momentum of between about 0.1 gram centimeter per second and 15 grams centimeter per second.

15. The encapsulated particle according to claim 13 wherein the temperature of the bed in the inner zone is less than 20° C.

* * * * *